United States Patent [19]

Myers

[11] Patent Number: 4,750,287
[45] Date of Patent: Jun. 14, 1988

[54] FISHING ROD LIGHT

[76] Inventor: Ernest L. Myers, 335 Worman Dr., Gahanna, Ohio 43230

[21] Appl. No.: 901,264

[22] Filed: Aug. 28, 1986

[51] Int. Cl.⁴ ............................................. A01K 87/00
[52] U.S. Cl. ..................................... 43/17.5; 43/18.1; 43/23
[58] Field of Search ................... 43/17.5, 18.1, 22, 23, 43/25

[56] References Cited

U.S. PATENT DOCUMENTS

| | | | |
|---|---|---|---|
| 1,421,399 | 7/1922 | Burgess | 43/17.5 |
| 2,579,087 | 12/1951 | Organ | 43/17.5 |
| 2,646,641 | 7/1953 | George | 43/17.5 |
| 2,791,676 | 5/1957 | Cote | 43/17.5 |
| 2,805,508 | 9/1957 | Oldfield | 43/17.5 |
| 3,128,023 | 4/1964 | Cook | 43/25 |
| 4,020,581 | 5/1977 | Genovese | 43/23 |
| 4,023,299 | 5/1977 | Maserang | 43/25 |
| 4,085,437 | 4/1978 | Hrdlicka | 43/17.5 |

Primary Examiner—Gene P. Crosby
Attorney, Agent, or Firm—T. M. Gernstein

[57] ABSTRACT

A fishing rod may include an integral flashlight having a magnifying lens and an on-off switch. A knife blade is embedded into a V-shaped notch in the rod handle to facilitate the cutting of fishing line. The end of the handle includes a storage compartment for hooks, sinkers, and the like, with access being provided through a removeable cap.

3 Claims, 2 Drawing Sheets

FISHING ROD LIGHT

BACKGROUND OF THE INVENTION

1. Field of the Invention

The present invention relates to fishing rods, and more particularly pertains to a combination fishing rod, storage compartment, light and knife assembly.

2. Description of the Prior Art

Fishing rods which have been modified to include accessories are well known in the art. Such accessories may include storage compartments, attachable light assemblies, line cutting devices, and the like.

While numerous storage compartment constructions in combination with fishing rods are known in the prior art, one of particular interest is to be found in U.S. Pat. No. 1,001,195, which issued to E. Gillette on Aug. 22, 1911. The fishing rod disclosed in this patent includes a hollow wooden handle having a removable, threadably attached end cap that thus provides access to an interior storage compartment. The storage compartment within the handle is large enough to hold sinkers, hooks, and the like, and at least partially eliminates the need for a user thereof to carry a separate tackle box.

There has also been a recognition of the need for a line cutter to be used in combination with a fishing rod. In this respect, reference is made to U.S. Pat. No. 3,128,023, which issued to J. Cook on Apr. 7, 1964. The Cook line cutter is a separable device having V-shaped notches with cutting blades therein. The device may be attached at any desired location along a fishing rod. The cutting blades essentially consist of an elongated razor blade extending through each of the plurality of V-shaped notches, while wrapped line is used to attach the cutter to the rod per se. While functional for its intended purpose, it can be appreciated that the Cook device could interfere with the free flow of fishing line along the fishing rod, and could thus effectively become more of a hinderance that a help.

With respect to lights used in combination with fishing rods, the prior art primarily discloses lights that are activated in response to a fish striking the associated line. For example, reference is made to U.S. Pat. No. 3,364,610, which issued to J. Poole on Jan. 23, 1968. The Poole light is illustrative of a number of similar lights disclosed in patents, and requires the attachment thereof to a fishing rod with the fishing line also being attached to a top portion of the light. In response to a strike by a fish, the line effectively pulls a contact switch into a closed position to activate the light. While also functioning in its intended manner, it can be appreciated that there are instances where a fisherman might desire to have the light continually illuminated, and this aspect of the light construction has not been addressed in the Poole reference.

In view of the various accessories available for fishing rods as discussed above, it would appear that there is a continuing need for such accessories, especially where a plurality of such accessories could be combined into a single fishing rod, and the present invention substantially fulfills this need.

SUMMARY OF THE INVENTION

In view of the foregoing disadvantages inherent in the known types of combination fishing rod and light assemblies now present in the prior art, the present invention provides an improved combination fishing rod and light assembly wherein various accessories are efficiently and inexpensively combined with the assembly. As such, the general purpose of the present invention, which will be described subsequently in greater detail, is to provide a new and improved combination fishing rod and light assembly which has all the advantages of the prior art combination fishing rod and light assemblies and none of the disadvantages.

To attain this, the present invention discloses a combination fishing rod and flashllight wherein the flashlight is integrally attached to the rod handle. The integral light can be adapted for use with virtually any major brand of fishing rod so that it can be used with all types of reels and under all types of fishing conditions, such as fly casting, bait casting and even deep sea fishing.

More particularly, the fishing rod is essentially of a conventional construction with the features that make the rod unique and novel being the addition of the above-discussed light, the inclusion of the small cutting blade in the top of the handle grip, and a hollow core within the grip which serves as a storage space for hooks and sinkers. It is desirable that a high quality fishing rod be utilized inasmuch as more expensive rods are extremely lightweight so as to overcome the additional weight added by a battery which powers the light and also the items stored within the handle. The handle grip is ideally constructed of cork which is light in weight and which provides for a firm grip. Access to the storage compartment is gained by either unscrewing the end or by a push-on cap. The fit of the end cap should be watertight so that no moisture can enter the storage compartment. With respect to the cutting blade, the same is retained within a small V-shaped groove carved into the cork handle. The edge of the knife blade is just below the surface of the handle so that there is no danger of the user touching the blade, while the blade operates to provide a cutting means for fishing line and the like.

The flashlight portion of the rod could be of a penlight style powered by a single battery, while it may be further equipped with a a magnifying lens to enhance the power of the light. The lens is placed at the very tip of the handle next to the juncture thereof with the rod, and an on-off switch is placed on the bottom of the handle just in front of a trigger grip.

In a modified form of the invention, a specialized flashlight may entail the use of a combined area light and a spotlight in a single unit. This would be best constructed as a fluorescent light and require a more powerful energy source. An additional light blinking function could also be added as a useful feature. Further, the rod portion of the fishing rod could be made so that it could be removed from the handle grip, whereby the flashlight portion of the handle could be better used as an area light. Additionally, the end of the handle could be made broad so that the handle could be placed upright on a flat surface, thereby to serve as a self supporting area light.

There has thus been outlined, rather broadly, the more important features of the invention in order that the detailed description thereof that follows may be better understand, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved combination fishing rod and flashlight which may be easily and efficiently manufactured and marketed.

It is a further object of the present invention to provide a new and improved combination fishing rod and flashlight which is of a durable and reliable construction.

An even further object of the present invention is to provide a new and improved combination fishing rod and flashlight which is susceptible of a low cost of manufacture with regard to both materials and labor, and which accordingly is then susceptible of low prices of sale to the consuming public, thereby making such combination fishing rods and flashlights economically available to the buying public.

Still yet another object of the present invention is to provide a new and improved combination fishing rod and flashlight which provides some of the advantages in the apparatuses and methods of the prior art, while simultaneously overcoming some of the disadvantages normally associated therewith.

Still another object of the present invention is to provide a new and improved combination fishing rod and flashlight which also includes an integral line cutter.

Yet another object of the present invention is to provide a new and improved combination fishing rod and flashlight which also includes an integral storage compartment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
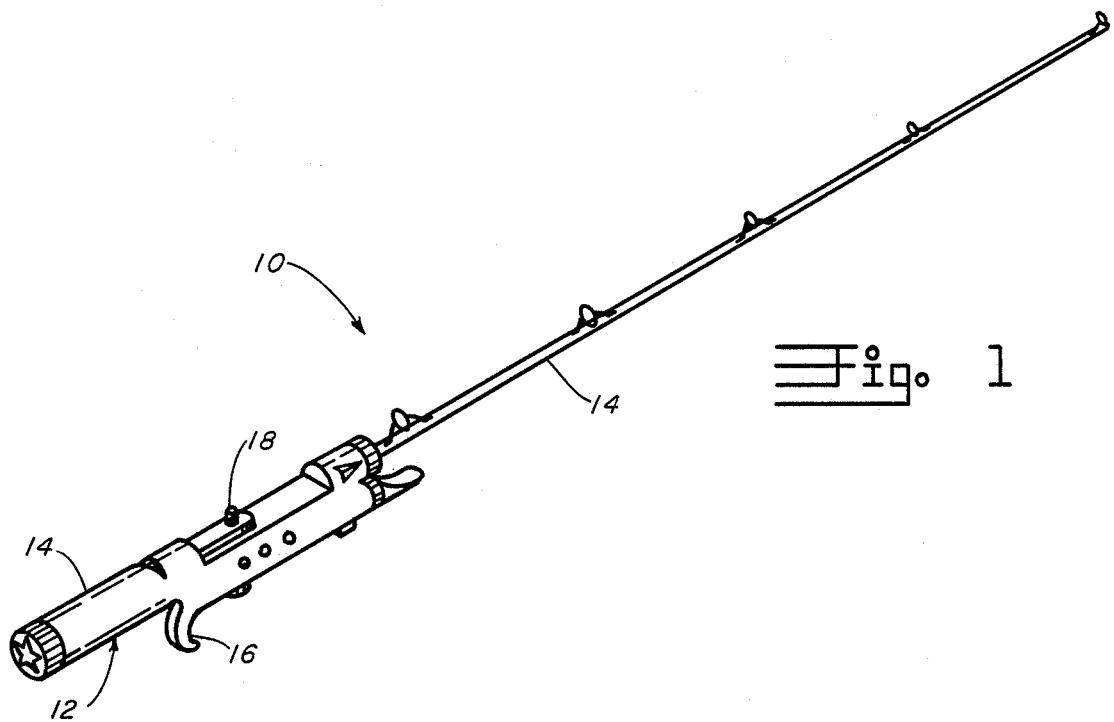
FIG. 1 is a perspective view of the combination fishing rod and flashlight comprising the present invention.

With reference now to the drawings, and in particular to FIG. 1 thereof, a new and improved combination fishing rod and flashlight embodying the principles and concepts of the present invention and generally designated by reference numeral 10 will be described.

More specifically, it will be noted that the fishing rod 10 essentially includes a handle 12 to which an elongated conventional rod 14 is attached. The handle 12 includes a handgrip section 14 with a downwardly extending finger grip trigger 16 integrally attached thereto. A conventional threadably-actuated reel attachment means 18 may be provided, with the reel attachment means being illustrative of any known or conceivable type of attaching means for virtually any conventional reel which could be used in combination with the fishing rod forming the invention.

Figure 2:
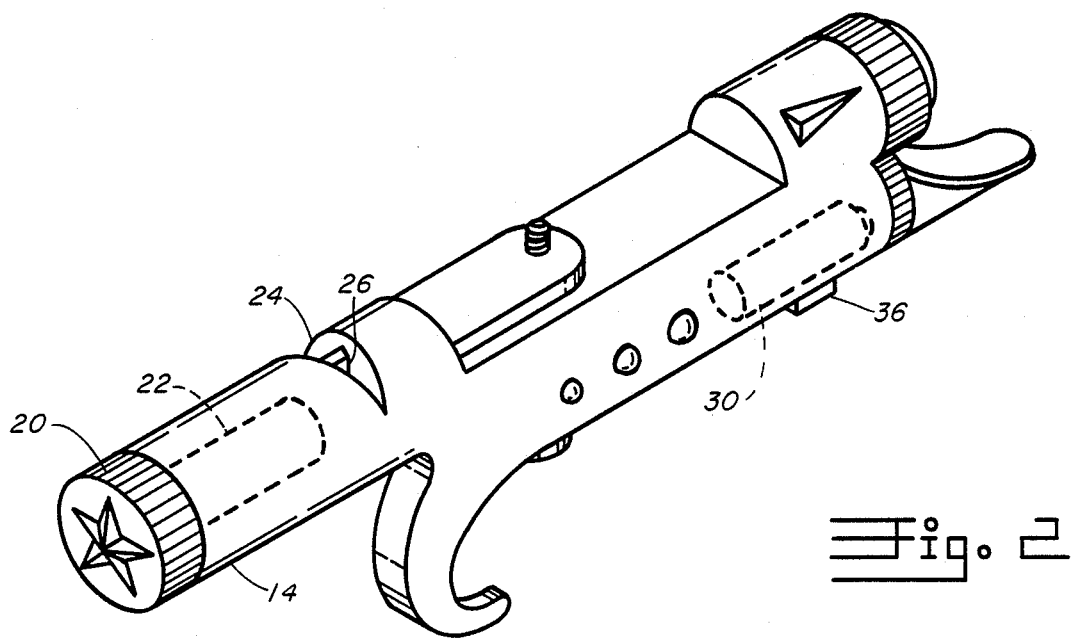
FIG. 2 is a perspective view of the handle portion of the present invention, wherein the fishing rod per se has been removed.

Referencing FIG. 2 in conjunction with FIG. 1, it will be noted that the handle assembly 12 may further include a threadably or otherwise removable end cap 20. The cap 20 operably seals an internal storage compartment 22 formed as a hollow chamber within the handgrip section 14. The storage compartment 22 serves as a storage means for hooks, sinkers, and the like which a fisherman may desire to use in combination with the fishing rod 10.

Figure 3:
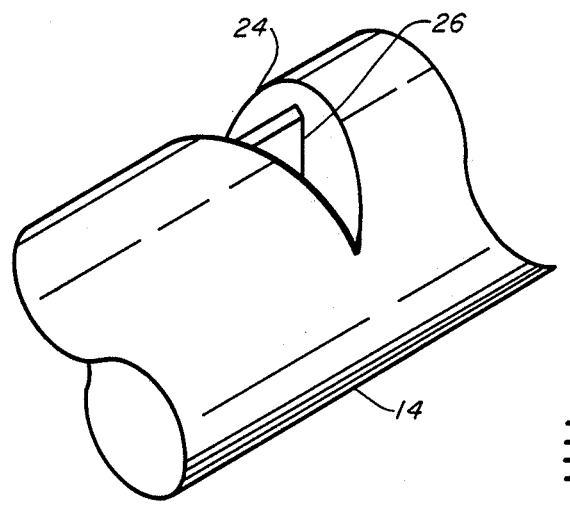
FIG. 3 is a partial perspective view showing the cutting blade assembly forming a part of the invention.

Referencing FIG. 3 in conjunction with FIGS. 1 and 2, it will be further noted that the handgrip 14 may include a V-shaped notch 24 into which is permanently attached a sharp cutting blade 26. In this respect, the blade 26 is recessed within the V-shaped notch 24 so that a user of the fishing rod 10 will not experience the danger of having his hand come into contact with the blade. However, fishing line can be directed downwardly into the notch 24 so, at the come into contact with the blade 26, thus to provide a means for cutting the fishing line when desired.

Figure 4:
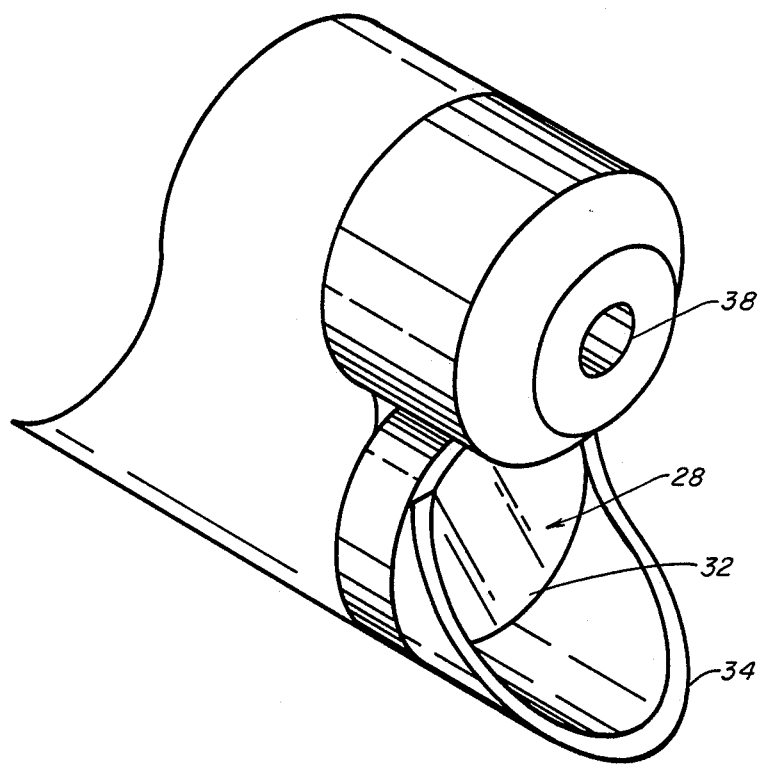
FIG. 4 is a partial perspective view showing the integral flashlight forming a part of the present invention.

Referencing FIG. 4 of the drawings in conjunction with FIG. 2, it will be noted that the fishing rod 10 further includes a flashlight assembly 28 integrally mounted within the handle structure 12. In this regard, a battery 30 may be mounted within a chamber contained within the handle 12, thereby to power the light assembly 28, while the electric light bulb associated with the flashlight may be operably attached to the battery behind a lens 32 as best illustrated in FIGS. 3 and 4. The lens 32 would preferably be a magnifying lens so as to enhance the illumination effect of the flashlight 28. A shield 34 may also be mounted to a bottom portion of the flashlight 28, to thereby further direct the emitted light in a desired direction. An on and off switch 36 would preferably be mounted to a bottom-most portion of the handle 12 to facilitate a control of the light 28 when desired.

A further feature of the invention is best illustrated in FIGS. 2 and 4 wherein it can be seen that the rod 14 has been removed from the handle 12. In this regard, the rod 14 would normally be retained within an aperture 38, with an attachment thereof being accomplished by some conventional means, and upon a removal of the rod, the handle assembly 12 then functions as an area flashlight. More specifically, the handle 12 can be conveniently used in the capacity of a flashlight without any interference from the normally attached rod member 14.

With respect to the manner of use and operation of the present invention, the same should be apparent from the above description. Accordingly, no further description of the manner of usage of the invention will be provided.

With respect to the above description then, it is to realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing rod assembly comprising:
   handle means;
   storage compartment means formed in said handle means, said storage compartment means being covered by an end cap means;
   rod means operably attached to said handle means, said rod means being removable therefrom;
   line cutting means operably mounted to said handle means, said line cutting means comprising a cutting blade mounted in a recessed manner within a V-shaped slot formed in said handle means; and
   flashlight means integrally attached to said handle means, said flashlight means including a magnifying lens to enhance an illumination effect thereof.

2. A fishing rod assembly, comprising:
   a. rod means;
   b. handle means operably attached to said rod means;
   c. flashlight means operably attached to said handle means;
   d. storage compartment means formed in said handle means;
   e. end cap means attachable to said handle means, said end cap means providing access to said storage compartment means; and,
   f. line cutting means, said line cutting means including a cutting blade mounted in said handle means, said cutting blade being recessed below an exterior surface of said handle means and being accessible through the side of said handle, thereby to prevent an accidental touching of said cutting blade by a user of said fishing rod assembly.

3. The fishing rod assembly of claim 2, wherein said cutting blade is recessed within a V-shaped slot.

* * * * *